(12) United States Patent
Agrawal et al.

(10) Patent No.: US 9,094,796 B2
(45) Date of Patent: Jul. 28, 2015

(54) MOBILE DEVICE TRAJECTORY ESTIMATION

(71) Applicant: International Business Machines Corporation, Armonk, NY (US)

(72) Inventors: Dakshi Agrawal, Monsey, NY (US); Bongjun Ko, Harrington Park, NJ (US); Murtaza Zafer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 13/936,602

(22) Filed: Jul. 8, 2013

(65) Prior Publication Data

US 2015/0011235 A1 Jan. 8, 2015

(51) Int. Cl.
*H04W 4/02* (2009.01)
*H04W 52/02* (2009.01)

(52) U.S. Cl.
CPC .......... *H04W 4/028* (2013.01); *H04W 52/0261* (2013.01)

(58) Field of Classification Search
USPC ....................... 455/456.1–6; 725/93; 701/408
See application file for complete search history.

(56) References Cited

U.S. PATENT DOCUMENTS

| | | |
|---|---|---|
| 2006/0235605 A1 | 10/2006 | Flynt |
| 2010/0273504 A1 | 10/2010 | Bull et al. |
| 2011/0034179 A1 | 2/2011 | David et al. |
| 2011/0246148 A1* | 10/2011 | Gupta et al. ...................... 703/2 |
| 2012/0165038 A1 | 6/2012 | Soma et al. |
| 2012/0244875 A1 | 9/2012 | Cardona et al. |
| 2012/0322459 A1 | 12/2012 | Jaffri et al. |
| 2013/0023286 A1 | 1/2013 | Soma et al. |
| 2013/0288673 A1* | 10/2013 | Le et al. ........................ 455/434 |

OTHER PUBLICATIONS

Rose, R., et al., "A GSM-Network for Mobile Phone Localization in Disaster Scenarios", Institute for Electronics Engineering, Friedrich-Alexander-University of Erlangen-Nuremberg, Mar. 14-16, 2011, Erlangen, Germany. Copyright 2011 IMAEV.
Varshney, U., et al., "Emerging mobile and wireless networks", Univ. of North Carolina at Wilmington, Wilmington, Communications of the ACM. Jun. 2000. vol. 43, No. 6.
Thiagarajan, A., et al., "Accurate, Low-Energy Trajectory Mapping for Mobile Devices", Proceedings of the 8th USENIX conference on Networked systems design and implementation. Mar. 2011.
Non-Final Office action dated Jan. 12, 2015 received for U.S. Appl. No. 14/066,219.

* cited by examiner

*Primary Examiner* — Diane Mizrahi
(74) *Attorney, Agent, or Firm* — Fleit Gibbons Gutman Bongini & Bianco PL; Jon A. Gibbons

(57) ABSTRACT

Disclosed is a novel system and method for utilizing information gathered at a based station for tracking a trajectory of a mobile device. Three types of information may be used including radio-layer information, ID information, session based information, or a combination thereof. The information is gathered at cellular base-stations to localize a mobile device. Cell towers have wide penetration and extensive coverage, and base-stations/mobile-devices have access to a lot of information. In one example, a method for tracking mobile device locations at a based station begins with accessing a list of mobile device information previously collected from mobile devices communicatively coupled over the wireless communications network to the base station. Currently active mobile device information measured by the network elements is accessed. A trajectory of the mobile device communicatively coupled to the base station is estimated by mapping the list of information previously collected with the currently active mobile device information.

14 Claims, 6 Drawing Sheets

| 302 MOBILE DEVICE INFORMATION CATEGORIES | 304 TYPES OF INFORMATION COLLECTED | 306 USAGE |
|---|---|---|
| 320 RADIO LAYER INFORMATION | • timing advance information<br>• arrival information,<br>• channel gain<br>• channel fade fluctuations<br>• received signal strength indicator (RSSI) | • For triangulation of the current mobile device location<br>• For determining the speed of the mobile device |
| 322 IDENTIFICATION INFORMATION | • a base station ID<br>• a location area code ID<br>• a mobile device ID | For determining the initial approximate location of the device |
| 324 SESSION BASED INFORMATION | • mobile device ID pair for a voice call<br>• a user-ID pair and server-address<br>• for a data session | For simultaneously determining the trajectories of two active mobile devices. This is useful for answering queries about how two users making a call are moving, |
| 326 OPTIONAL LOCAL MOBILE DEVICE INFORMATION | • GPS information from local mobile device<br>• Accelerometer Information from local mobile device<br>• WIFI identification | For providing additional information from the device itself including GPS coordinate, accelerometer information, and WIFI information |

| MOBILE DEVICE INFORMATION CATEGORIES | TYPES OF INFORMATION COLLECTED | USAGE |
|---|---|---|
| RADIO LAYER INFORMATION | • timing advance information<br>• arrival information,<br>• channel gain<br>• channel fade fluctuations<br>• received signal strength indicator (RSSI) | • For triangulation of the current mobile device location<br>• For determining the speed of the mobile device |
| IDENTIFICATION INFORMATION | • a base station ID<br>• a location area code ID<br>• a mobile device ID | For determining the initial approximate location of the device |
| SESSION BASED INFORMATION | • mobile device ID pair for a voice call<br>• a user-ID pair and server-address<br>• for a data session | For simultaneously determining the trajectories of two active mobile devices. This is useful for answering queries about how two users making a call are moving. |
| OPTIONAL LOCAL MOBILE DEVICE INFORMATION | • GPS information from local mobile device<br>• Accelerometer Information from local mobile device<br>• WIFI identification | For providing additional information from the device itself including GPS coordinate, accelerometer information, and WIFI information |

FIG. 3

MOBILE DEVICE TRAJECTORY ESTIMATION

BACKGROUND

The present invention generally relates to mobile devices, and more specifically to mobile device location tracking.

Determining the geographic location of mobile devices is an important problem, and has applications in a plethora of location-based-services. With the wide and growing adoption of smartphones, there is a rapidly growing set of location-based-services designed for use with smartphones. For example, location information is used in navigation applications, location-based mobile advertisements and mobile asset tracking, to name a few. The primary mechanism by which mobile device location is determined currently is through the use of Global Positioning System (GPS) application on the device, which can determine the device location in an outdoor environment using satellite beacons. The main disadvantage of using GPS for continuous location tracking is that it drains battery energy quickly. Therefore, a GPS within a mobile device cannot be turned on for extended periods of time.

Another method of determining device location is through the use of device connectivity information; for example, based on the WiFi access points that a device can see, its location can be determined relative to the known locations of those access points. The drawback of this method is that the deployment of WiFi access points is not centrally controlled, their IDs have conflicting and changing names, and they have very sparse deployment outside urban areas and small coverage areas.

Yet, still another method of continuous tracking is through the information of the mobile device's association with base stations. The base station ID and the mobile device association are used. This provides only very course grained tracking which may not be sufficient in some applications.

Yet another method of location tracking is by triangulation of mobile device's location through the measurement of wireless signals between the mobile device and multiple base stations. This also provides only course grained location estimates which may not be sufficiently precise in some applications.

Further, current location tracking of mobile devices use continuous location tracking. This continuous tracking consumes a significant amount of battery power. This continuous drain on battery power is undesirable in mobile device location tracking.

BRIEF SUMMARY

Disclosed is an automated system and method for utilizing information gathered at a based station for tracking a trajectory of a mobile device. Three types of information may be used including radio-layer information, ID information, session based information, or a combination thereof. The information is gathered at cellular base-stations to localize a mobile device. Cell towers have wide penetration and extensive coverage, and base-stations/mobile-devices have access to a lot of information.

The temporally ordered mobile device measurements are matched with pre-computed spatio-temporal signatures of possible trajectories. This matching can be done dynamically by starting with the initial estimates of the device and obtaining the temporal radio-layer signatures that could be generated on different possible trajectories of the device. For each match a score is computed which reflects the probability of the mobile device being on that trajectory. This score is dynamically updated as more measurements are made. Output the mobile device location if such a sufficiently high probability or highest score is reached, otherwise declare non-localizable after a certain time-period lapse.

In one example, the method for tracking mobile device locations begins with accessing a list of mobile device information previously collected from mobile devices communicatively coupled over the wireless communications network to the base station. Currently active mobile device information is accessed. The currently active mobile device information includes timing advance information and/or angle of arrival information. A trajectory of the mobile device communicatively coupled to the base station is estimated by mapping the list of information previously collected with the currently active mobile device information.

In one example, besides timing advance information, arrival information or a combination thereof, the mobile device information includes radio-layer information including at least one of channel gain, channel fade fluctuations, received signal strength indicator (RSSI), or a combination thereof.

In another example, besides timing advance information, arrival information or a combination thereof, the mobile device information includes identification (ID) information including at least one of a mobile device ID, a base station ID, a location area code ID, or a combination thereof.

In yet, another example, besides timing advance information, arrival information or a combination thereof, the mobile device information includes session based information including at least one of a mobile device ID pair for a voice call, a user-ID pair and server-address for a data session, or a combination thereof.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 is a table of mobile device information collected at a base station used by the localization manager of FIG. 2;

DETAILED DESCRIPTION

Figure 1:
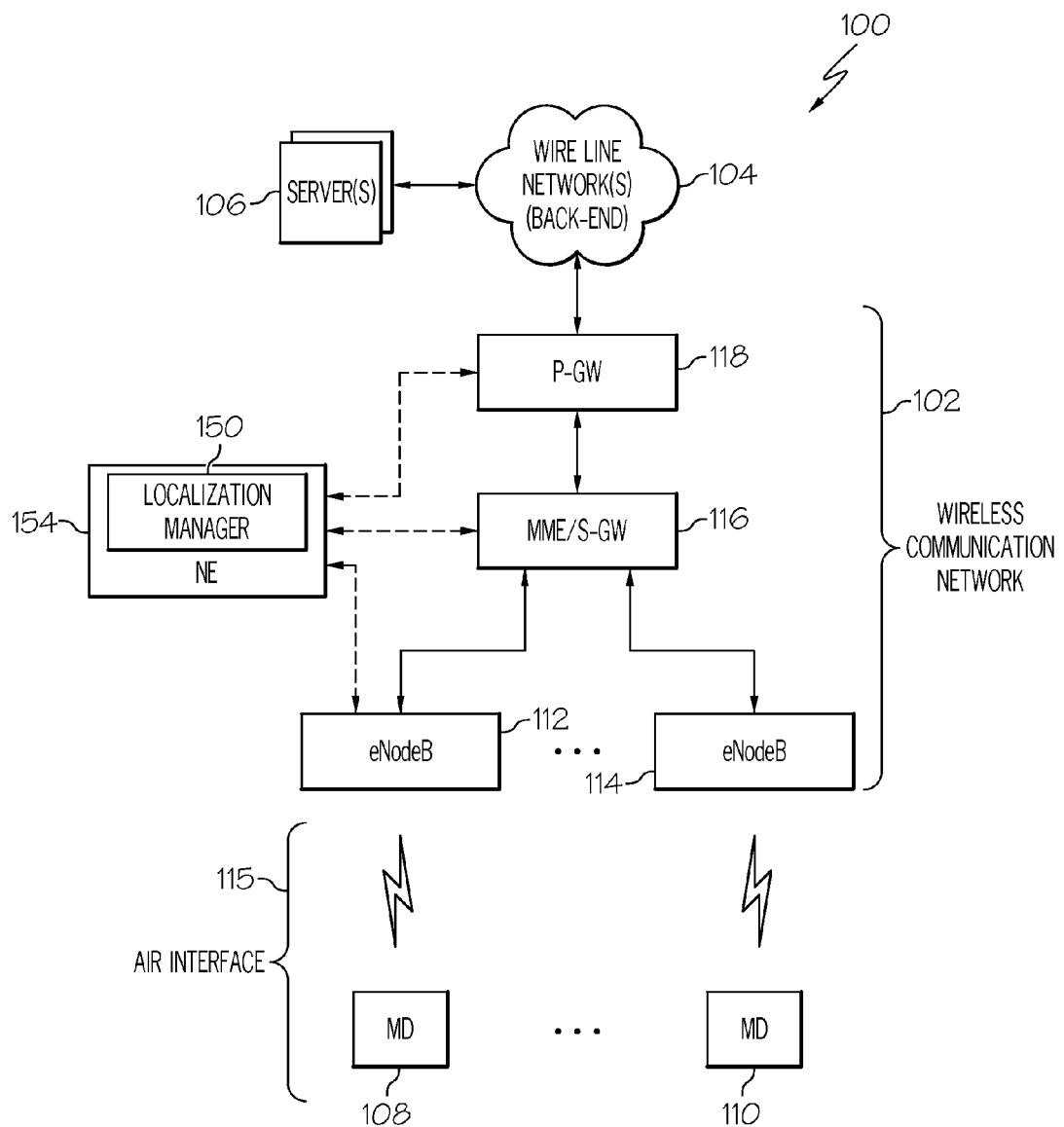
FIG. 1 is a block diagram illustrating one example of an operating environment.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

NON-LIMITING DEFINITIONS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, integers, steps, operations, elements, components, and/or groups thereof.

The term "angle of arrival" (AoA) measurement is a method for determining the direction of propagation of a radio-signal wave incident on an antenna array. AoA determines the direction typically by measuring the time difference of arrival at individual elements of the array.

The term "base station" as used herein is typically a fixed receiver/transmitter that serves as a hub for a wireless network, and may be the gateway between wired and wireless networks.

The term "identification information" or ID information "mobile device identifier" as used herein is, a base station ID, a location area code ID, a mobile device ID such as telephone number, IMSI number, MSISDN, or other information stored on a SIM card or a combination thereof.

The term "location area code ID" is code associated with a geographical area with radio coverage by one or more base stations.

The term "measure by the network element" is information, such as "radio-layer information" that can typically only be available at "base station" and not available at the mobile device.

The term "mobile device information" is information, typically gathered at a base station including radio-layer information, ID information, and session based information used to estimate a trajectory of the device.

The term "network element" as used herein refers to a logical or physical element within the cellular network that handles the data and control traffic for mobile devices, typically located at a fixed location and interconnected with each other through network links. Examples of network elements include base stations, MME, S-GW, P-GW, etc.

The term "radio-layer information" as used here is information on how a radio-signal propagates from the mobile device to the base station including timing advance information, arrival information, channel gain, channel fade fluctuations, received signal strength indicator (RSSI), or a variations or combination thereof.

The term "received signal strength indicator" is often abbreviated (RSSI) and is the relative received radio-signal strength in a wireless environment, in arbitrary units. RSSI is an indication of the power level being received by the antenna. Therefore, the higher the RSSI number the stronger the signal.

The term "session based information" as used herein is a mobile device ID pair for a voice call, a user-ID pair and server-address for a data session, or a combination thereof.

The term "spatio-temporal signatures" as used herein is information "measured by a network element" with both a position information (spatio) and time information (temporal) associated with a given mobile device ID (signature).

The term "timing advance" a value that corresponds to a length of time a signal take to reach a base station from a mobile device.

The term "wireless communications network" as used herein includes one or more communication networks. The wireless communications standard(s) of the network(s) 110 can comprise Code Division Multiple Access (CDMA), Time Division Multiple Access (TDMA), Global System for Mobile Communications (GSM), General Packet Radio Service (GPRS), Frequency Division Multiple Access (FDMA), Orthogonal Frequency Division Multiplexing (OFDM), Orthogonal Frequency Division Multiple Access (OFDMA), Wireless LAN (WLAN), WiMAX or other IEEE 802.16 standards, Long Term Evolution (LTE), or any other current or future wireless communication standard. It should be noted that the operating environment 100 can also include a peer-to-peer (P2P) based messaging system (not shown) such as a PIN-based messaging system.

Overview

Each geographic location has a radio-layer signature. Even though a single location of radio-layer information of a mobile device may not be unique, the temporally generated radio-layer information is unique to the mobile device trajectory over time. Therefore, the combination of location-specific radio-layer signatures on a trajectory gives unique spatio-temporal signature of a trajectory.

A data analytics based approach using information at a base station in a wireless communications network is used to determine mobile device localization. The process includes accessing a time-ordered list of mobile device radio-layer information previously collected from one or more of mobile devices. This is historic data and can include wireless channel gain, received signal strength indicator, base-station identifiers, or a combination thereof. Next, active mobile device information is accessed including timing advance information from at least one mobile device communicatively coupled to the base station over a wireless communication network. Using the historic and active information, a trajectory of the mobile device communicatively coupled to the base station is estimated by mapping the time-ordered list of radio-layer information previously collected with the currently active mobile device radio-layer information including timing advance information. Unlike GPS, or WiFi location technologies, the mobile device does not need to keep a separate GPS radio or WiFi radio enabled and drain battery power.

The present invention utilizes radio-layer information which is already computed in the cellular network. This can be easily added using existing cellular infrastructure and offered as a service.

Operating Environment

FIG. 1 shows an operating environment 100 according to one embodiment of the present invention. The operating environment 100 comprises one or more wireless communication networks 102 that are communicatively coupled to one or more wire line networks 104. For purposes of simplicity, only the portions of these networks that are relevant to embodiments of the present invention are described. The wire line network 104 acts as a back-end for the wireless communication network 102. In this embodiment, the wire line network 104 comprises one or more access/core networks of the wireless communication network 102 and one or more Internet Protocol (IP) networks such as the Internet. The wire line network 104 communicatively couples, for example, one or more content sources/providers, such as a server(s) 106, to the wireless communication network 102. In further embodiments, the back-end is not a wire line network. For example, in one embodiment the back-end is a wireless network and takes the form of a point-to-point back-end network such as a directional microwave network used to transmit and receive signals bi-directionally. Alternatively, the back-end takes the form of a network of peers in which a mobile base station (e.g., eNodeB in the case of LTE) is itself used as a back-end network for other base stations.

The wireless communication network 102 supports any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication network 102 includes one or more networks based on such standards. For example, in one embodiment, the wireless communication network 102 comprises one or more of a Long Term Evolution (LTE) network, an Evolution Data Only (EV-DO) network, a GPRS network, a Universal Mobile Telecommunications System (UMTS) network, and the like. In the example of FIG. 1, the wireless communication network 102 is an LTE network.

FIG. 1 further shows that one or more mobile devices 108, 110 are communicatively coupled to the wireless communication network 102. The mobile devices 108, 110, in this embodiment, are wireless communication devices such as two-way radios, cellular telephones, mobile phones, smartphones, two-way pagers, wireless messaging devices, laptop computers, tablet computers, desktop computers, personal digital assistants, and other similar devices. Mobile devices 108, 110 access the wireless communication network 102 through one or transceiver nodes 112, 114 situated at the edge of the wireless communication network 102. For example, the mobile devices 108, 110 access the wireless communication network 102 through one or more transceiver nodes 112, 114 using one or more air interfaces 115 established between the mobile devices 108, 110 and the transceiver nodes 112, 114.

In another embodiment, one or more mobile devices 108, 110 access the wireless communication network 102 via a wired network and/or a non-cellular wireless network such as, but not limited to, a Wireless Fidelity (WiFi) network. For example, the mobile devices 108, 110 can be communicatively coupled to one or more gateway devices via wired and/or wireless mechanisms that communicatively couples the mobile devices 108, 110 to the wireless communications network 102. This gateway device(s), in this embodiment, communicates with the wireless communication network 102 via wired and/or wireless communication mechanisms.

The mobile devices 108, 110 interact with the wireless communication network 102 to send/receive voice and data communications to/from the wireless communication network 104. For example, the mobile devices 108, 110 are able to wirelessly request and receive content (e.g., audio, video, text, web pages, etc.) from a provider, such as the server 106, through the wireless communication network 102. The requested content/service is delivered to the wireless communication network 102 through the wire line network 104.

A transceiver node 112, 114 is known as a base transceiver station (BTS) or just a base station, a NodeB, and/or an Evolved NodeB (eNodeB) depending on the technology being implemented within the wireless communication network 104. This exemplary embodiment relates to an LTE network, so the illustrated transceiver nodes 112, 114 are eNodeBs. The transceiver nodes 112, 114 are communicatively coupled to one or more antennas communicates directly with the core of the wireless communication network 102. It should be noted that in another embodiment, a radio network controller (RNC) or base station controller (BSC) is communicatively coupled to a transceiver node 112, 114 for managing and controlling one or more base stations.

In the example shown in FIG. 1 one or more mobility management entities and serving gateway nodes (MME/S-GW) 116 are communicatively coupled to the plurality of eNodeBs 112, 114. A packet gateway node (P-GW) 118 is communicatively coupled to the MME/S-GW 116 and to the wire line network 104 (e.g., Core IP Network). It should be noted that even though FIG. 1 shows the MME combined with the S-GW, the MME can be separate and distinct from the S-GW. It should be noted that the MME/S-GW is also referred to herein as the "MME 116". The MME/S-GW 116 manages mobility (e.g., a transfer) of the mobile devices across different eNodeBs and also acts as a serving gateway for data. The P-GW 118 acts as the gateway to the wire line network 104.

In one example, the communication protocols between the mobile devices 108, 110 and the P-GW 118 are various 3rd Generation Partnership Project (3GPP) protocols over which the internet protocol (IP) traffic from the mobile devices 108, 110 is tunneled. For example, a GPRS tunneling protocol (GTP) is utilized between the eNodeBs 112, 114 and the MME/S-GW 116 as well as between the MME/S-GW 116 and the P-GW 118. A standard Internet Protocol (IP) is utilized between the P-GW 118 and the wire line network 104. The server(s) 106 has a TCP (Transmission Control Protocol) socket that communicates with a TCP socket at the mobile devices 108, 110 when a user wishes to access data from the server 106. An IP tunnel is created from the P-GW 118 to mobile devices 108, 110 for user traffic and passes through the interim components, such as the MME/S-GW 116.

FIG. 1 further shows that at least one of the eNodeBs 112, 114 and the P-GW 118 are each communicatively coupled to a localization manager 150 which provides mobile device trajectory estimation. At least one of the network elements in the cellular network (for example, eNodeBs 112, 114, the MME/S-GW 116, or the P-GW 118) is coupled to a localization manager 150. In one embodiment, the localization manager 150 resides within the eNodeB 112. Similarly, in another embodiment, the localization manager 150 resides within the P-GW 118 or within MME/S-GW 116. In yet another embodiment, the localization manager 150 is separate and distinct from the network elements, but is remotely coupled with one or more network elements.

Figure 2:
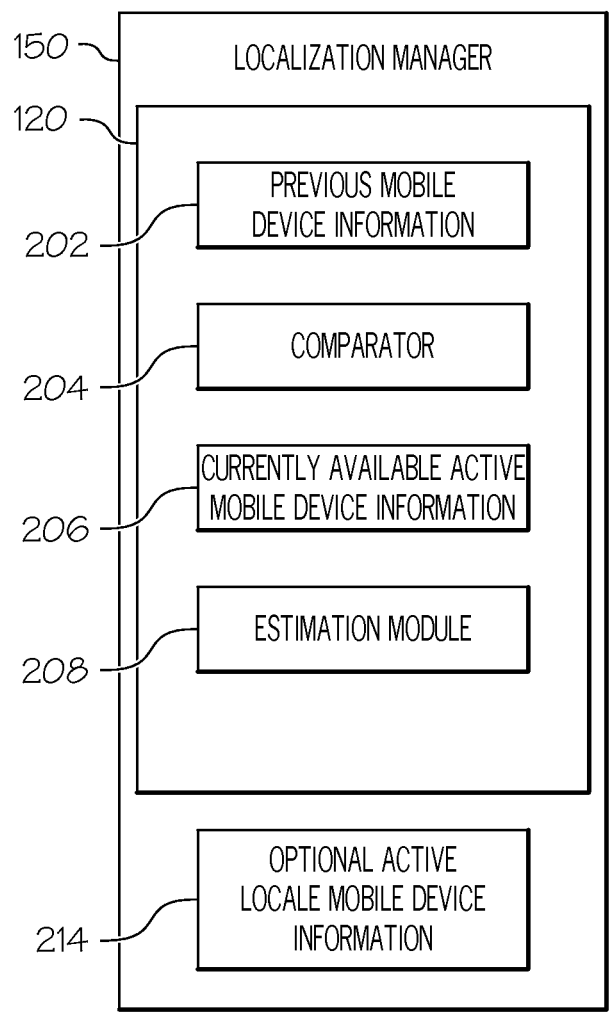
FIG. 2 is a block diagram illustrating a detailed view of a localization manager.

FIG. 2 is a more detailed example of the localization manager 150. In particular, FIG. 2 shows that the localization manager 150 comprises previous mobile device information 202, a comparator 204, current active mobile device information 206, and an estimation module 208. FIG. 2 further shows that optional active local mobile device information 214 is also included within the localization manager 150. This optional active local mobile device information 214 is information sent by mobile device(s) 108, 110 to the transceiver node 112, 114 (base station). This information includes global position system (GPS) information, and accelerometer information. It is important to note that the local mobile device information 214 can also be collected historically and stored with previous mobile device information 202 as an enhancement to the history. The localization module 150 and its components are discussed in greater detail below.

Mobile Device Information

The following is a more detailed discussion on detecting information from mobile devices 108, 110 in the wireless communication network 102. The information is operational information on how wireless signals propagate from each of the mobile devices 108, 110 back to base station or transceiver node 112, 114. Referring now to FIG. 3, shown is a table 300 of mobile device information collected at a base station used by the localization manager 150 of FIG. 2. The first column 302 of the table 300 is categories of mobile device information. Shown are four categories in each of the rows as follows: radio-layer information 320, identification information 322, session based information 324, and optional local device information 326. It is important to note that all the types of information collected 304 in rows 320, 322, 324 are collect from the base station or transceiver node 112, 114. Only the optional information in row 326 is collected from the mobile device themselves. Accordingly, other than the optional information, all the information is available at the base station or transceiver node 112, 114.

An example of the usage of the categories of mobile information 302 by localization manager 150 of FIG. 2 is shown in column 306. For example, in radio-layer information 302 includes one or more of i) timing advance information, ii) arrival information, iii) channel gain, iv) channel fade fluctuations, v) received signal strength indicator (RSSI) or a combination thereof. This radio-layer information 302 may be used for triangulation of the current mobile location and/or for determining the speed of the mobile device. Continuing further, the identification information 322 includes one or more of i) base station id, ii) a location area code ID, and iii) mobile device ID or a combination thereof. The identification information 322 may be used for determining the initial approximate location of the mobile device. Continuing still further, the session based information 324 includes one or more of i) mobile device ID pair for a voice call and/or ii) a user-ID and server-address pair for a data session, or a combination thereof. The session information 324 may be used for simultaneously determining the trajectories of two active mobile devices. This is useful for answering queries about how two users making a call on their respective mobile devices are moving. Continuing yet still further, the optional local mobile device information 326 includes one or more of: i) GPS information from local mobile device, ii) accelerometer Information from local mobile device, WiFi identification, or a combination thereof. This is optional local mobile device information 326 may be used for providing additional information from the device itself including GPS coordinate, accelerometer information, and WiFi information.

Estimating Trajectory of Mobile Device

Figure 4:
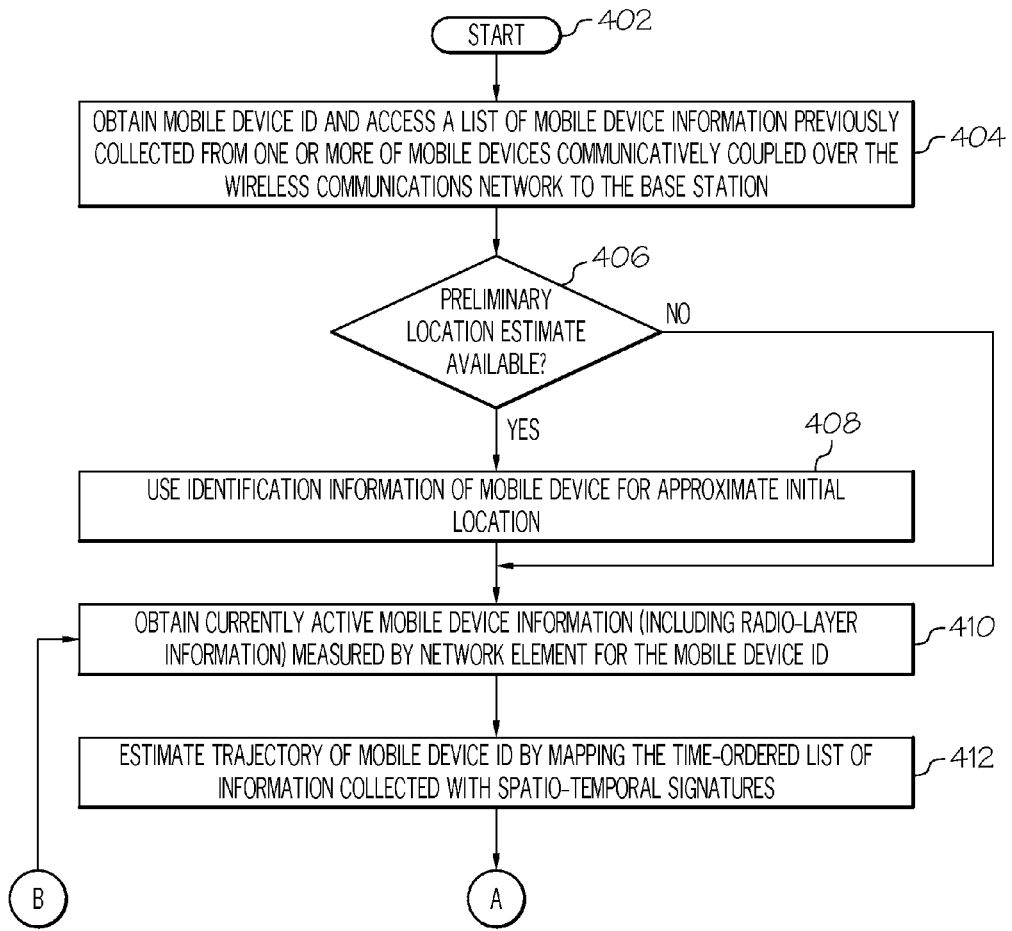
FIGS. 4-5 is a flow chart of a mobile device trajectory estimation using the information of FIG. 3.
Figure 5:
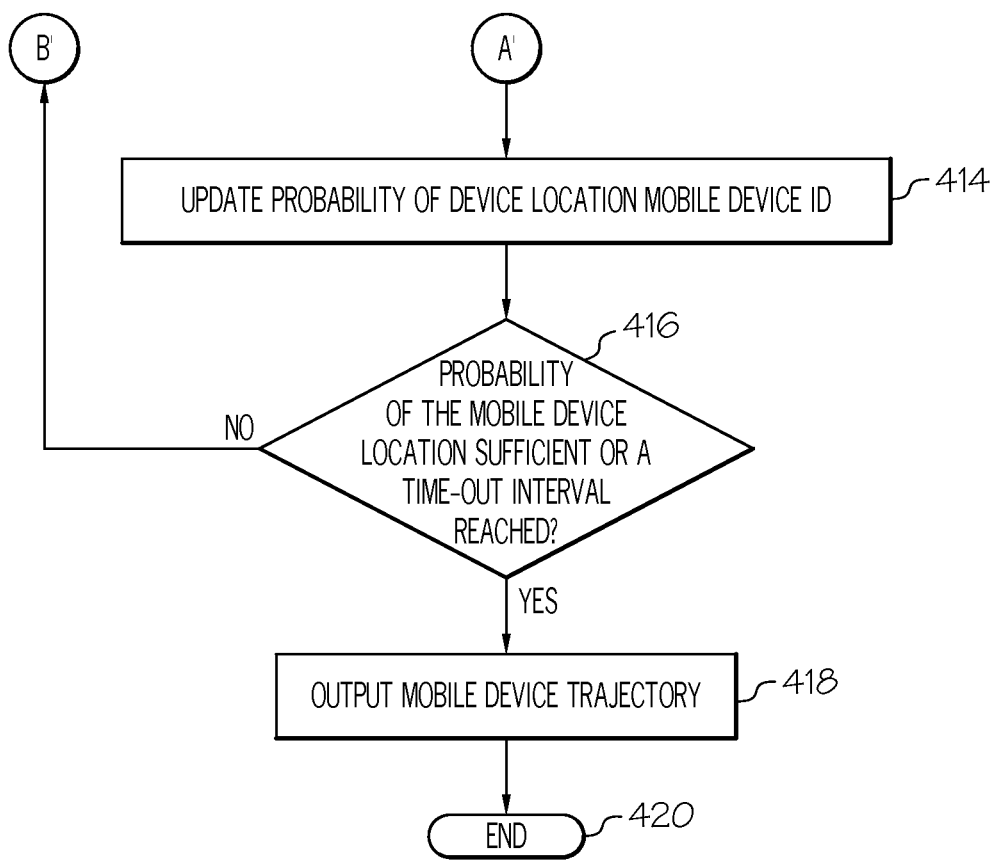

As mentioned above, mobile device location at a network element is accomplished using spatio-temporal signatures of mobile device information, such as radio-layer characteristics, to localize a mobile device. Turning now to FIGS. 4-5 are more detailed steps. Shown is a flow chart of mobile device trajectory estimation using the information from table 300 of FIG. 3. The process begins in step 402 and immediately proceeds to step 404 where the mobile ID of a mobile device is obtained. The mobile device ID can be a telephone number, an IMSI number, a MSISDN, or other information stored on a SIM card or a combination thereof. Also a list of mobile device information previously collected from one or more mobile devices coupled over the wireless network to the base station is accessed. The database (or store of previous mobile device information 202) of spatio-temporal mobile device signatures of various trajectories is also periodically updated to account for changing environment conditions. Using the mobile device ID, a test in step 406 is made to determine if a preliminary estimate of the mobile device location using historical information. In response to preliminary location estimate being available, historical information may be the last location recorded for the mobile device ID in step 408. Otherwise, in response to preliminary estimate of mobile device location not being available a uniform estimate is used. The uniform estimate in one example is a uniform probability distribution over a certain geographical area. The uniform probability in a given geographical area can include the area of the currently known location of the mobile device. The location derived from a geographic location associated with a base station, a routing area, a location area a GPS location, a WiFi location or combination thereof. The process proceeds to step 410.

In step 410, the currently active mobile device information including radio-layer information measured by a network element for the mobile device ID is collected by the localization manager 150. Examples of the information collected are shown in table 300 of FIG. 3. This includes radio-layer information, time advance information, angle of arrival information, ID information, session information or a combination thereof.

At step 412, an estimated trajectory of mobile device ID is calculated by mapping the time-ordered list of information collected with spatio-temporal signatures. Stated differently, the mobile device information for the mobile device ID is collected over time. This information of time-ordered radio-signatures of the mobile device ID is iteratively measured by the network element. These time-ordered radio-signatures are compared with pre-mapped radio-layer signatures of mobile trajectories in the given geographical area. Trajectories are mapped against different road-network/path/walkway segments within the geographic area. A determination is made of which one of these segments best fit the data being currently collected. As matches are found, update the probability of the mobile device location. Example methods of comparing mobile device information with the pre-mapped mobile device could be using dynamic programming, Viterbi algorithm, etc. The comparison accounts for the mobile device speed by checking for multiple sampling durations and picking the one that gives the best match. It is important to note that radio-layer information, such as timing-advance and radio-layer information, is location specific and not mobile device ID specific. A probability of the location of the mobile device ID location is updated in step 414. A loop condition is evaluated in step 416. An accuracy of the mobile device ID trajectory is compared to a given threshold. If the accuracy is below the threshold the process continues to collect more information back to step 410 to collect more information. A time out interval may also be used in addition to the threshold condition.

Steps 410, 412, and 414 are repeated until the probability of mobile device location in a certain segment is sufficiently high as compared with the threshold. The threshold and timeout can be a pre-determined threshold and timeout set by a user, by the system or dynamically based on historical data, or a combination thereof. Otherwise, the process continues to step 418 in which the mobile device trajectory is rendered or furnished and the process ends at step 420.

It should be appreciated that the flow diagrams hereof are illustrative. One or more of the operative steps illustrated in any of the flow diagrams may be performed in a differing order. Other operations, for example, may be added, modified, enhanced, condensed, integrated, or consolidated with the steps thereof. Such variations are intended to fall within the scope of the appended claims. All or portions of the flow diagrams may be implemented partially or fully in hardware in conjunction with machine executable instructions.

Information Processing System

Figure 6:
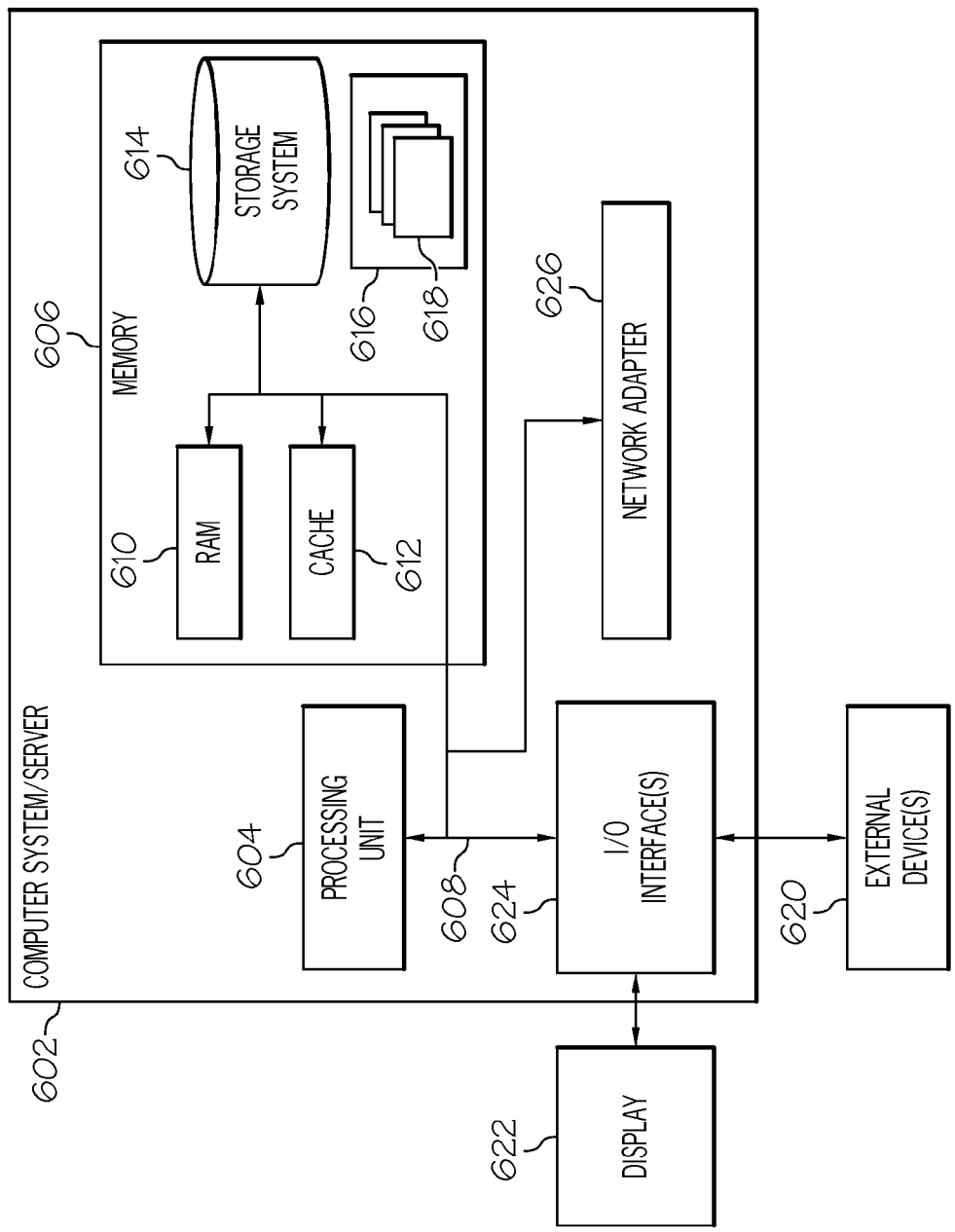
FIG. 6 is a block diagram illustrating one example of an information processing system.

Referring now to FIG. 6, this figure is a block diagram illustrating an information processing system that can be utilized in embodiments of the present invention. The information processing system 602 is based upon a suitably configured processing system configured to implement one or more embodiments of the present invention (e.g., the NE 154 of FIG. 1). Any suitably configured processing system can be used as the information processing system 602 in embodiments of the present invention. The components of the information processing system 602 can include, but are not limited to, one or more processors or processing units 604, a system memory 606, and a bus 608 that couples various system components including the system memory 606 to the processor 604.

The bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 6, the main memory 606 includes the localization manager 150. The localization manager 150 can reside within the processor 604, or be a separate hardware component. The system memory 606 can also include computer system readable media in the form of volatile memory, such as random access memory (RAM) 610 and/or cache memory 612. The information processing system 602 can further include other removable/non-removable, volatile/non-volatile computer system storage media. By way of example only, a storage system 614 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 608 by one or more data media interfaces. The memory 606 can include at least one program product having a set of program modules that are configured to carry out the functions of an embodiment of the present invention.

Program/utility 616, having a set of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of embodiments of the present invention.

The information processing system 602 can also communicate with one or more external devices 620 such as a keyboard, a pointing device, a display 622, etc.; one or more devices that enable a user to interact with the information processing system 602; and/or any devices (e.g., network card, modem, etc.) that enable computer system/server 602 to communicate with one or more other computing devices. Such communication can occur via I/O interfaces 624. Still yet, the information processing system 602 can communicate with one or more networks such as a local area network (LAN), a general wide area network (WAN), and/or a public network (e.g., the Internet) via network adapter 626. As depicted, the network adapter 626 communicates with the other components of information processing system 602 via the bus 608. Other hardware and/or software components can also be used in conjunction with the information processing system 602. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for tracking mobile device locations, the method at network element in a wireless communications network comprising:

accessing a list of mobile device information previously collected from one or more of mobile devices communicatively coupled over the wireless communications network to a base station;

accessing currently active mobile device information measured by the network element; and estimating a trajectory of the mobile device communicatively coupled to a base station by mapping the list of information previously collected with the currently active mobile device information, wherein the mobile device information measured by the network element is radio-layer information includes timing advance information that corresponds to a length of time a radio-signal takes to reach a based station from at least one mobile device coupled over the wireless communications network.

2. The method of claim 1, wherein the radio-layer information including at least one of
channel gain;
channel fade fluctuations;
or
a combination thereof.

3. The method of claim 1, wherein the mobile device information includes identification (ID) information including at least one of a mobile device ID, a base station ID, a location area code ID, or a combination thereof.

4. The method of claim 1, wherein the mobile device information includes session based information including at least one of a mobile device ID pair for a voice call, a user-ID pair and server-address for a data session, or a combination thereof.

5. The method of claim 1, wherein the accessing currently active mobile device information includes accessing information for at least one mobile device with a mobile device identifier (ID) and a mobile device with a same mobile device identifier (ID) that has been previously collected.

6. The method of claim 5, wherein the estimating the trajectory of the mobile device communicatively coupled to the base station by mapping the list of information previously collected with the currently active mobile device information further includes using a previously estimated location for the active mobile device as a starting point for the trajectory.

7. The method of claim 1, wherein the accessing a list of mobile device information previously collected from one or more of mobile devices includes a time-order list of mobile device information.

8. The method of claim 7, wherein the time-order list of mobile device information is collected over non-uniform time intervals.

9. The method of claim 1, wherein the currently active mobile device information is pre-computed using historical information.

10. The method of claim 9, wherein the currently active mobile device information is pre-computed over time.

11. The method of claim 1, further comprising:
receiving local mobile device information from at least one of the mobile devices, the local device information including at least one of global positioning system (GPS) information, and accelerometer information; and
storing this local device information in the list of mobile device information previously collected.

12. The method of claim 1, further comprising:
receiving local mobile device information from the mobile device, the local device information including at least one of global positioning system (GPS) information, and accelerometer information and using this local device information for estimating the trajectory.

13. The method of claim 1, wherein the trajectory of the mobile device is estimated dynamically by matching the list of mobile device information of the mobile device with a list of pre-computed signatures for possible locations and maintaining a score of a match.

14. The method of claim 12, wherein the trajectory with a highest score and whose score is above a pre-determined threshold is selected as the estimate of the trajectory.

* * * * *